United States Patent [19]

Staples

[11] Patent Number: 5,398,768
[45] Date of Patent: Mar. 21, 1995

[54] AERATOR

[76] Inventor: Clarke H. Staples, 1131 S. 112th St., Lincoln, Nebr. 68520

[21] Appl. No.: 126,801

[22] Filed: Sep. 24, 1993

[51] Int. Cl.$^6$ .............. A01B 45/02; A01B 73/00; A01B 63/00
[52] U.S. Cl. .............. 172/21; 172/78; 172/43; 172/122; 172/244; 172/259; 172/260; 172/397; 172/358; 172/540
[58] Field of Search .............. 172/21, 22, 43, 75, 172/78, 118, 122, 240, 244, 259, 260, 397, 398, 540, 358, 71, 74, 318, 322, 323, 337, 478, 354; 37/387, 189, 94; 280/405.1; 404/90; 56/17.1, 17.2; 299/39

[56] References Cited
U.S. PATENT DOCUMENTS

| 2,638,831 | 5/1953 | Ferguson et al. | 172/22 |
| 3,236,312 | 2/1966 | Vivas | 172/122 |
| 3,870,604 | 3/1971 | Allard | 172/22 |
| 4,192,387 | 3/1980 | Stinson | 172/21 |
| 4,867,244 | 9/1989 | Cozine et al. | 172/22 |
| 4,921,051 | 5/1990 | Annen | 172/21 |
| 5,207,278 | 5/1993 | Hatlen | 172/22 |

FOREIGN PATENT DOCUMENTS 1089843  11/1967  United Kingdom .............. 172/21

Primary Examiner—Dennis L. Taylor
Assistant Examiner—Spencer Warnick
Attorney, Agent, or Firm—Zarley, McKee, Thomte Voorhees & Sease

[57] ABSTRACT

An aerator includes a frame supported on a pair of forward drive wheels and a pair of rearward caster wheels. An aerator head is mounted on a pivot frame on the forward end of the aerator frame, pivotable to move the aerator head from a disengaged position above the ground, downwardly to an engaged position wherein tines on the aerator head work the soil. The pivot frame includes a forwardly projecting arm upon which the aerator head is mounted, and a rearwardly projecting arm upon which the forward wheels of the frame are mounted, such that movement of the pivot frame will engage either the forward wheels of the frame or the aerator head with the ground. The aerator head is mounted forwardly of the forward end of the frame such that the tines on the aerator head form the forward most part of the aerator.

7 Claims, 3 Drawing Sheets

AERATOR

TECHNICAL FIELD

The present invention relates generally to lawn aerating apparatus, and more particularly to an aerator with forward mounted tine wheels and an improved engagement apparatus for engaging and disengaging the tine wheels with the ground.

BACKGROUND OF THE INVENTION

Aeration apparatus are well known for their beneficial affects in lawn service. However, conventional aerators are heavy relatively cumbersome pieces of equipment for a sole individual to operate.

Conventionally, aerators include a motor and drive mechanism mounted on a frame having forward and rearward sets of wheels, with a aeration drum having tines projecting therefrom located between the forward and rearward sets of wheels. In operation, the forward set of wheels is retracted such that the forward end of the housing rests on the drum and tines, thereby driving the tines into the ground to aerate the ground. One of the main problems with conventional aerators is that the aerator must be tipped back on its rear wheels in order to turn or maneuver the apparatus, thereby lifting the tined drum upward off the ground because of the weight of the aerator, this can become a tiring task.

Yet another problem with conventional aerators lies in the location of the aerator drum. Because the conventional aerator has a set of wheels forwardly of the aeration drum, it is difficult to aerate portions of the ground located adjacent walls, fences, or other fixed objects.

SUMMARY OF THE INVENTION

It is therefore a general object of the present invention to provide an improved aerator.

Yet another object of the present invention is to provide an aerator with a simple and convenient set of retractable drive wheels to permit ease of handling.

A further object of the present invention is to provide an aerator with an aerator head located forwardly of the aerator frame, to reach closely adjacent fixed objects.

These and other objects will be apparent to those skilled in the art.

The aerator of the present invention includes a frame supported on a pair of forward wheels and a pair of rearward wheels. The rearward wheels are preferably caster type wheels to permit turning of the aerator about the forward end of the frame. An aerator head is mounted on a pivot frame on the forward end of the aerator frame, the pivot frame mounted to move the aerator head from a disengaged position above the ground, downwardly to an engaged position wherein tines on the aerator head work the soil. The pivot frame includes a forwardly projecting arm upon which the aerator head is mounted, and a rearwardly projecting arm upon which the forward wheels of the frame are mounted, such that movement of the pivot frame will engage either the forward wheels of the frame or the aerator head. The aerator head is mounted forwardly of the forward end of the frame such that the tines on the aerator head form the forward most part of the aerator. A motor on the aerator selectively engages both the forward support wheels on the frame and the aerator head so as to propel the aerator. An hydraulic cylinder is mounted between the frame and the pivot frame to selectively move the pivot frame to engage the aerator head or the forward wheels with the ground.

DESCRIPTION OF THE PREFERRED EMBODIMENT

Figure 1:
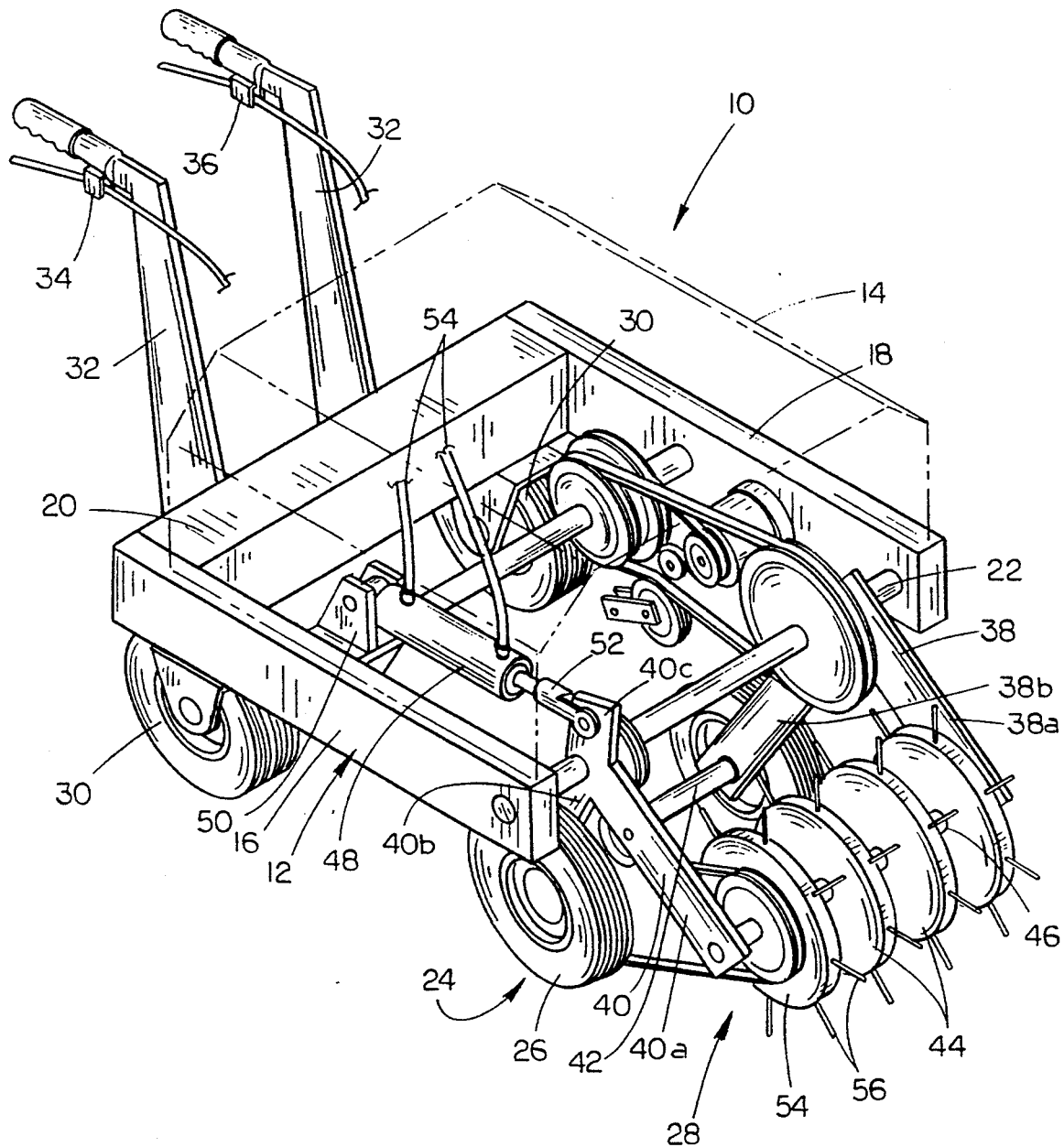
FIG. 1 is a perspective view of the aerator of the present invention, with the motor and motor housing removed to show the drive mechanism.

Referring now to the drawings, in which similar or corresponding parts are identified with the same reference numeral, and more particularly to FIG. 1, the aerator of the present invention is designated generally at 10 and includes a support frame 12 and a conventional drive motor (not shown) mounted within a motor housing 14 (shown in broken lines).

Frame 12 includes a pair of side frame members 16 and 18 having forward and rearward ends, with a rearward frame member 20 connecting the rearward ends of side frames 16 and 18, thereby forming a generally U-shaped frame. A generally cylindrical shaft 22 is mounted between the forward ends of side frames 16 and 18 and serves as the pivotal axis for a pivot frame 24 which supports a pair of drive wheels 26 and an aerator head 28, as described in more detail hereinbelow.

A pair of caster wheels 30 are mounted at the rearward ends of side frames 16 and 18 and are freely rotating and free to turn, such that the rearward end of frame 12 is easily moved relative to drive wheels 26 and aerator head 28. A pair of rearwardly projecting handles 32 are mounted to rearward frame number 20 to guide aerator 10, and to support operator control switches 34 and 36.

Pivot frame 24 includes a right and left bracket 38 and 40 pivotally connected to shaft 22. Bracket 38 includes a forwardly projecting arm 38a and a rearwardly projecting arm 38b, with the bracket pivotally connected at the junction of arms 38a and 38b to shaft 22. Left bracket 40 includes a forward arm 40a, rearward arm 40b, and an upwardly projecting leg 40c, bracket 40 being pivotally connected to shaft 22 at the junction of arms 40a, 40b and leg 40c.

Drive wheels 26 are mounted on an axle 42 for simultaneous rotation, with axle 42 rotatably journaled between the lower ends of right bracket rear leg 38b and left bracket rear leg 40b. Similarly, a plurality of tine wheels 44 are mounted on an axle 46 for rotation therewith, axle 46 being rotatably journaled between the lower ends of right bracket forward leg 38a and left bracket forward leg 40a.

An hydraulic cylinder 48 is pivotally connected at its rearward end to a bracket 50 mounted on side frame member 16. An extensible shaft 52 projects from the forward end of cylinder 48 and is pivotally connected at its forward end to leg 40c of left bracket 40. Hydraulic lines 54 extend to a conventional hydraulic valve and pump (not shown) which is operated by control switch 34, so as to extend or retract shaft 52.

Figure 2:
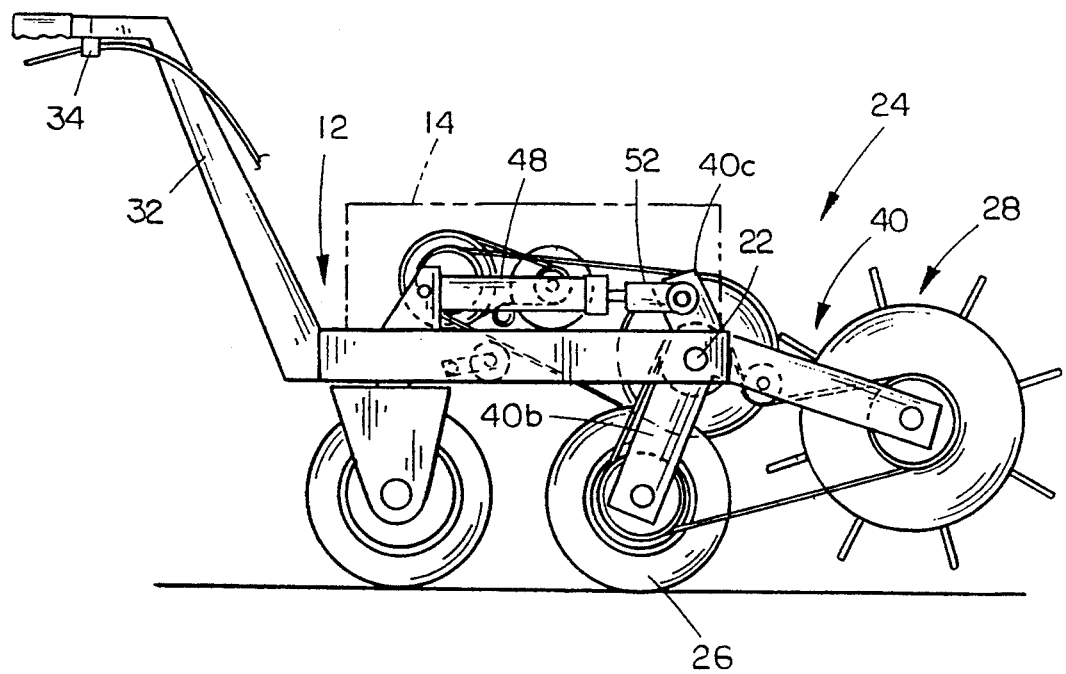
FIG. 2 is a side elevational view of the apparatus shown in FIG. 1, with the forward drive wheels engaged with the ground.
Figure 3:
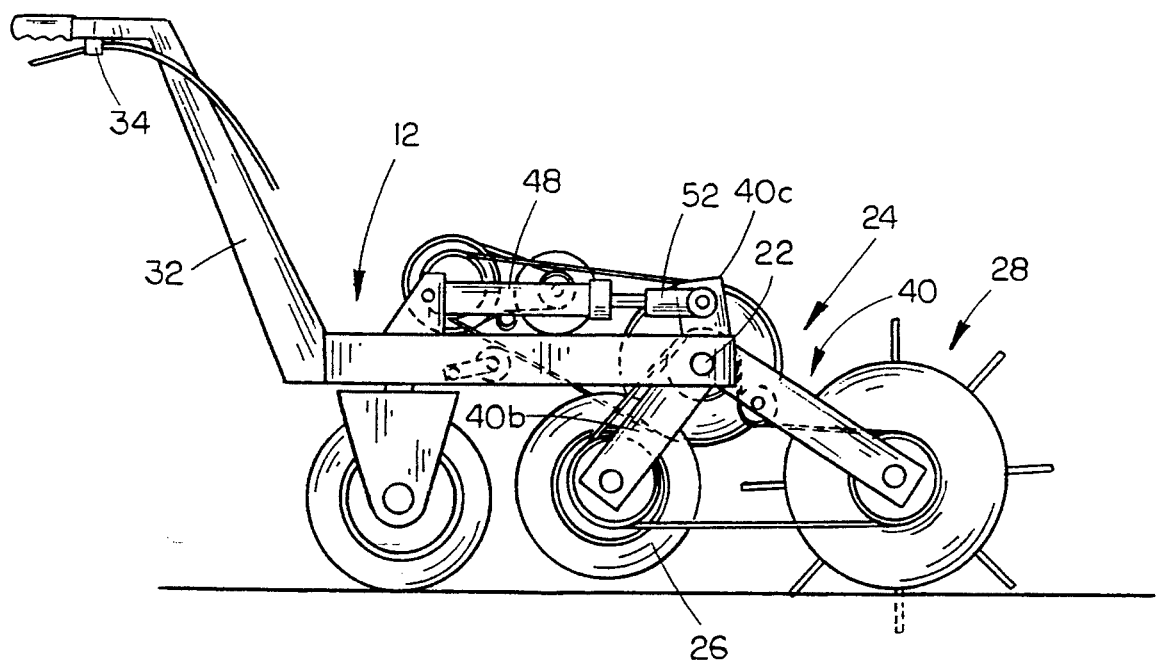
FIG. 3 is an elevational view similar to FIG. 2, but with the aerator head in engagement with the ground.

Referring to FIGS. 2 and 3, the actuation of cylinder 48 moves pivot frame 24 so as to engage either drive wheels 26 (as shown in FIG. 2) or aerator head 28 (as shown in FIG. 3) with the ground. Thus, the retracted position of shaft 52 pulls leg 40c rearwardly and pivots left bracket 40 about shaft 22 so as to pivot arm 40b forwardly so as to engage drive wheels 26 with the ground. Extending shaft 52 will move pivot frame 24 about shaft 22 so as to lower aerator head 28 until it engages the ground. Further pivotal movement of pivot frame 24 will cause shaft 22 in the forward end of frame 12 to move upwardly, thereby disengaging drive wheels 26 from the ground.

Referring again to FIG. 1, each tine wheel 44 includes a disk 54 with a plurality of cylindrical tines 56 projecting radially therefrom. Tine wheels 44 are preferably uniformly spaced along axle 46.

Figure 4:
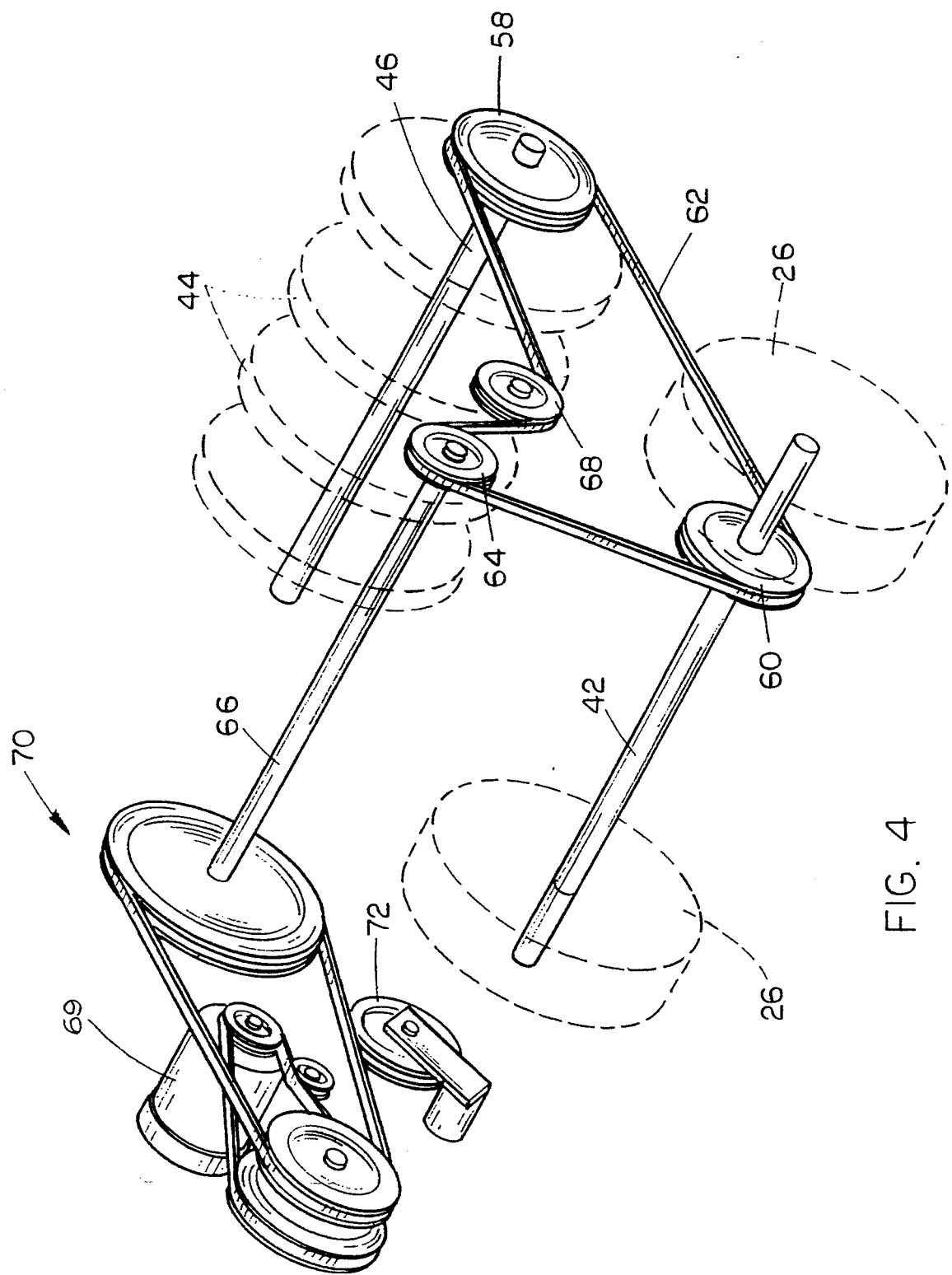
FIG. 4 is a perspective view of the drive mechanism of the present invention.

FIG. 4 is a perspective view of the drive mechanism for tine wheels 44 and drive wheels 26. A drive pulley 58 is mounted on tine wheel axle 46 for rotation therewith. A second drive pulley 60 is mounted On drive wheel axle 42 for rotation therewith. A drive belt 62 is journaled about drive pulleys 58 and 60, and thence over a drive pulley 64 mounted on a drive shaft 66, such that both drive wheel axle 42 and tine wheel axle 46 are simultaneously driven by drive shaft 66. A free wheeling pulley 68 is located to place tension on drive belt 62 to maintain engagement of drive belt 62 with all three drive pulleys 58, 60 and 64. Drive shaft 66 is interconnected to a drive motor 69 through a series of reduction gears 70, in a conventional fashion. A clutch 72 is connected to control switch 36 (see FIG. 1) so as to engage or disengage motor 69 with drive shaft 66.

Whereas the invention has been shown and described in connection with the preferred embodiment thereof, it will be understood that many modifications, substitutions and additions may be made which are within the intended broad scope of the appended claims. There has therefore been shown and described an improved aerator which accomplishes at least all of the above stated objects.

I claim:

1. An aerator, comprising:
   a frame having a plurality of support wheels, at least one of said support wheels being selectively driven to propel the frame;
   said support wheels including at least one forwardly mounted wheel and at least one rearwardly mounted wheel;
   motor means on said frame operably connected to at least one of said wheels for selectively driving said wheel;
   an aerator head with soil working means, operably mounted on said frame for movement between an engaged position with the soil working means in engagement with the ground, and a disengaged position with the soil working means raised out of contact with the ground;
   said aerator head projecting forwardly beyond said frame;
   a pivot frame pivotally mounted to said frame for movement between first and second positions;
   said aerator head being mounted on said pivot frame for movement between the engaged position when the pivot frame is in the first position, and the disengaged position when the pivot frame is in the second position;
   said forwardly mounted wheel rotatably mounted to said pivot frame and located to engage the ground and support the frame when the pivot frame is in the second position, and raised above the ground when the pivot frame is in the first position; and
   means for selectively pivoting the pivot frame between the first and second positions.

2. The aerator of claim 1, wherein said pivot frame includes:
   a forward arm having upper and lower ends pivotally connected to said frame at the upper end thereof; and
   a rearward are having upper and lower ends rigidly connected at the upper end thereof to the upper end of the forward arm, for pivotal movement therewith.

3. The aerator of claim 2, wherein said aerator head is operably mounted on the lower end of the forward arm and the forwardly mounted wheel is rotatably mounted on the lower end of the rearward arm.

4. The aerator of claim 2, wherein said motor means is operably selectively connected to both said forward wheel and said aerator head to selectively propel the aerator when the pivot frame is in the first and second positions.

5. An aerator, comprising:
   a frame having a plurality of support wheels, at least one of said wheels being selectively driven to propel the frame and including at least one forwardly mounted wheel;
   a pivot frame pivotally mounted to said frame for movement between first and second positions;
   an aerator head with soil working means operably mounted on said pivot frame for movement therewith between an engaged position with the soil working means in engagement with the ground when the pivot frame is in the first position and a disengaged position with the soil working means raised out of contact with the ground when the pivot frame is in the second position;
   motor means on said frame for selectively driving said driven wheel to propel the aerator;
   means for selectively pivoting said pivot frame between the first and second positions; and
   said forwardly mounted wheel being rotatably mounted on said pivot frame and located to engage the ground and support the frame when the pivot frame is in the second position and raised above the ground when the pivot frame is in the first position.

6. The aerator of claim 5, wherein said pivot frame includes:
   a forward arm having upper and lower ends pivotally connected to said frame at the upper end thereof; and
   a rearward arm having upper and lower ends rigidly connected at the upper end to the upper end of the forward arm, for pivotal movement therewith.

7. The aerator of claim 6, wherein said aerator head is operably mounted on the lower end of the forward arm and the forward wheel is rotatably mounted on the lower end of the rearward arm.

* * * * *